United States Patent [19]
Norris

[11] 4,235,533
[45] Nov. 25, 1980

[54] CARD MOTION PICTURE EDITING SYSTEM

[75] Inventor: Philip R. Norris, North Reading, Mass.

[73] Assignee: Polaroid Corporation, Cambridge, Mass.

[21] Appl. No.: 47,022

[22] Filed: Jun. 11, 1979

[51] Int. Cl.³ .............................................. G03B 41/00
[52] U.S. Cl. ...................................... 352/129; 352/82
[58] Field of Search ...................... 352/129, 82, 83, 38, 352/221

[56] References Cited

U.S. PATENT DOCUMENTS

| 955,666 | 4/1910 | Muller et al. | 352/82 |
|---|---|---|---|
| 1,557,597 | 10/1925 | Lube | 352/82 |
| 2,905,048 | 9/1959 | Miller | |
| 3,252,372 | 5/1966 | Gallina | |
| 3,284,923 | 11/1966 | Leslie | 352/82 |
| 3,684,359 | 8/1972 | Land | 352/38 |
| 3,724,935 | 4/1973 | Batter | 352/38 |

Primary Examiner—Monroe H. Hayes
Attorney, Agent, or Firm—David R. Thornton

[57] ABSTRACT

An editing device for use with film units having a plurality of images thereon. A film unit is placed in such device in a manner such that selected images which are desired to be viewed, as in a film projection apparatus, are identifiably presented to the user of the device. The projection apparatus is designed to monitor the white border of the film unit and to rapidly advance the latter to thereby eliminate projection of given portions when a black surface is sensed, and the editing device presents to the user both the selected frames and selected portions of the surface of the film unit corresponding to such identified images. The light reflecting characteristics of such selected surface portions are then suitably altered, as by blackening thereof to make them effectively light absorbent so as to control subsequent projection. Re-editing of the previously edited portions can occur by whitening portions or all of the previously blackened portions of the film unit.

8 Claims, 5 Drawing Figures

CARD MOTION PICTURE EDITING SYSTEM

BACKGROUND OF THE INVENTION

This invention relates generally to motion picture editing systems and, more particularly, to editing devices for use with systems which utilize separate film units having a plurality of film images thereon as opposed to systems which utilize continuous reels of film.

Present day motion picture taking and projection systems utilize continuous reels of film in which a plurality of sequentially produced images are vertically positioned along a continuous film roll during the picture taking process, reels of 50 feet, 100 feet, 500 feet, 1,000 feet, etc. being utilized to store such rolls of film images. During projection onto a screen, each of the sequentially filmed image transparencies on a film roll are vertically and intermittently moved past a suitable light and optical system so as to be intermittently projected onto a screen via an appropriate projection lens system at a rate which provides to the viewer a substantially continuous motion of the projected images on the screen.

A problem in such conventional motion picture systems lies in the difficulty in evaluating a scene which has been taken until the entire film roll has been utilized and developed for projection. Even where substantially instantaneous development can be achieved, such evaluation must often await the projection of a significant portion of a film roll containing a large number of different scenes before a particular scene can be looked at for such evaluation.

It is desirable, therefore, to design a motion picture taking system in which scenes of average length (e.g., the time of an average scene is often about 10-15 seconds) can be more easily evaluated without having to review other scenes of no particular interest at the time. Such a design also makes it possible to view such relatively short scenes substantially immediately after taking, either in transparency form or in projected form.

An approach to the design of a system utilizing a plurality of separate film transparency units, each of which has multiple images thereon, is described in the commonly assigned application of Philip R. Norris filed concurrently herewith as application Ser. No. 47,141, entitled "Card Motion Picture Projection System" which is incorporated herein by reference.

As disclosed in the system of such application, a preferred embodiment of the film units used therein has a plurality of arcuate, or crescent-shaped, rows of images thereon. In the particular projection system described therein, each film unit is rapidly advanced from a stack thereof to a position wherein suitable intermittent movement of the film unit permits a sequential projection of the images thereon to be made.

In some instances, it may be desirable to edit the film unit, as discussed in the above-referenced copending application describing such projection system, in order to select only certain rows of images for projection and to eliminate from the projection process the remaining rows thereof. Such editing can be accomplished in the projection system described by changing the light reflecting characteristics of one or more portions of a side edge of a film unit which is to be edited so that projection only of selected rows of images occurs. It is desirable to be able to edit such film units rapidly and accurately with minimal difficulty for such purpose.

SUMMARY OF THE INVENTION

In accordance with the invention, an editing device is designed so that a film unit can be held in place so that the rows of arcuate images which are desired to be projected are appropriately identified and only the required portion, or portions, of the film unit are effectively exposed. The light reflecting characteristics of such portions can then be altered, as by blackening thereof to make such portions effectively light absorbent. A blackening agent can be easily applied to such exposed portion, or portions, and the "edited" film unit removed from the device.

DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Prior to discussing the illustrated embodiment, it should be first noted that the illustrated film unit 11 is of the type described in the aforementioned copending application, which includes a plurality of recorded images in successive arcuate rows normal to the unit's longitudinal axis, and that projection of the images is provided by scanning each row in succession with a light source and an optical projection assembly.

Further, the projector described in the aforementioned application also employs a pair of photodetectors, which sense the white borders of the film unit, to provide rapid advance of both the film unit undergoing projection out of the projection zone and rapid advance of the next unit into the projection zone. This arrangement is also employed for editing of the film, and entails blackening selected lengths of the film unit border to thereby produce a photodetector signal which, in turn, controls rapid advancement of the unit. Hence, by proper selection of blackened lengths of the border, the unit will be moved rapidly over selected image rows which thereby remain unprojected.

Figure 1:
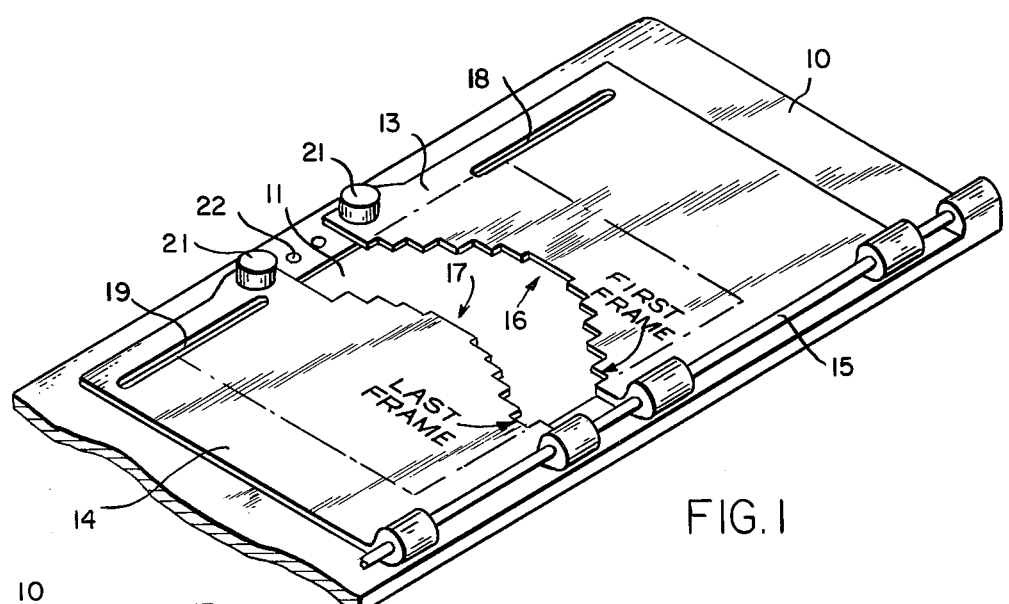
FIG. 1 shows a perspective view of an editing device of the invention.
Figure 2:
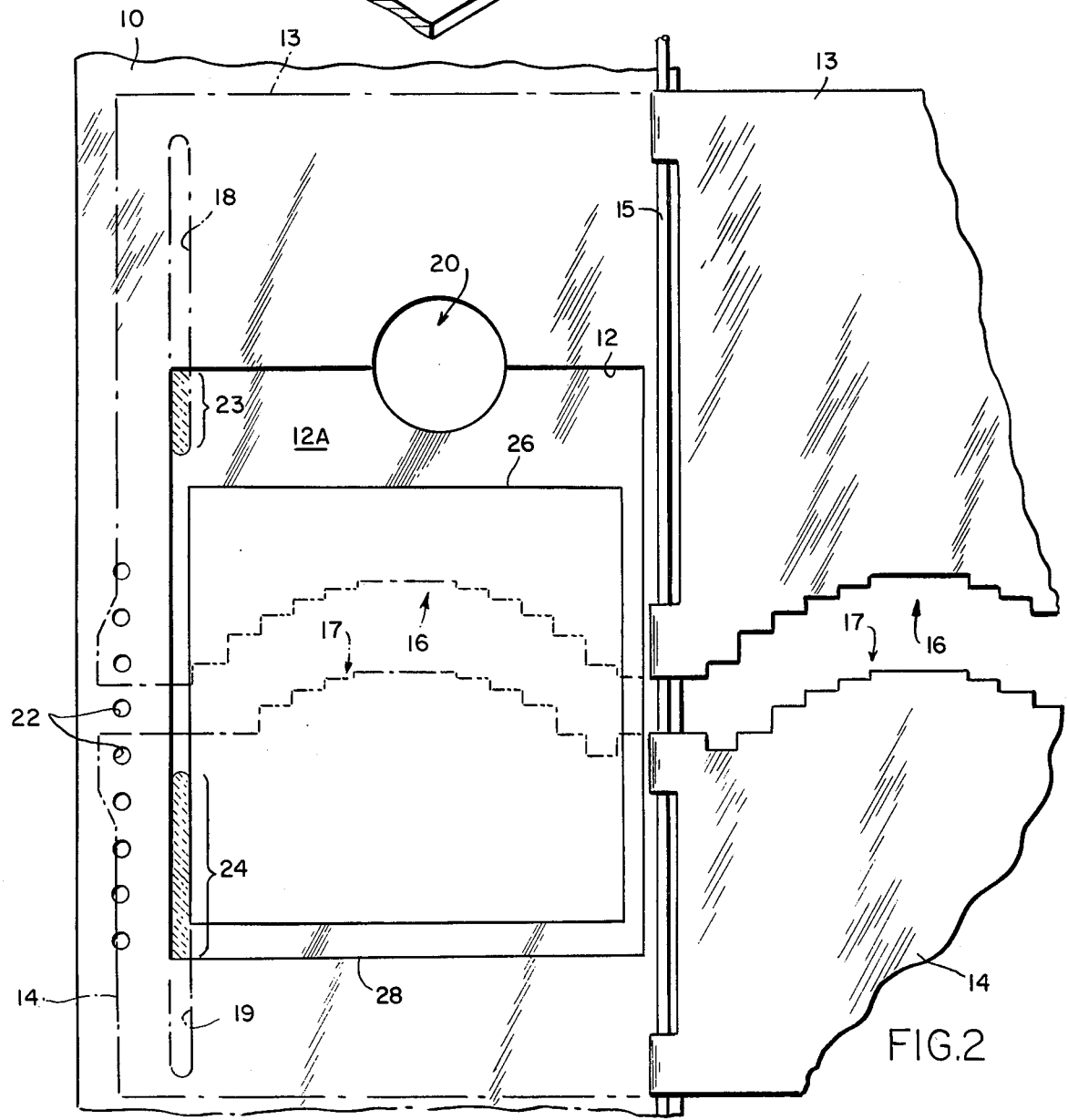
FIG. 2 shows a plan view of the device of FIG. 1 in an opened, film receiving condition.

Turning now to the illustrated embodiment, as seen in FIGS. 1 and 2, a frame member 10 permits a film unit 11 to be placed on the surface thereof in a suitable recessed region 12 having the same dimensions as the film unit. The recessed region 12 includes a step portion 12a for supporting the film unit while permitting light to enter the recess for illuminating images. Preferably, the full recess is constructed of transparent material. Hence, it should be understood that the recess 12 provides means for positioning and locating a film unit in the frame and for permitting transmission of light for illuminating the film images.

A pair of templates or movable members 13 and 14 are hingedly mounted on rod 15 for movement along the rod and for folding over frame member 10 at selected positions as desired. The edges 16 and 17 of members 13 and 14, respectively, provide row delineating edges and, hence, are shaped so as to correspond to the arcuate shape of the rows of images on film unit 11 and define the leading and trailing image rows, respectively, when the members 13 and 14 are folded onto frame member 10 at appropriately selected positions so as to leave exposed, between edges 16 and 17, the arcuate rows of images on film unit 11 which are desired to be projected. Slots 18 and 19 near the edges of members 13 and 14, respectively, permit access to, or expose the portions 23 and 24 of the border, or side edge, of the film unit 11 which must be altered, for example blackened, in order that only the desired arcuate rows of images are projected when the film unit is used in the projection system described in the above-referenced application. Stated otherwise, the edge of the film unit can be suitably blackened by ink, crayon, paint, or other appropriate material, applied through slots 18 and 19 to the portions 23 and 24 of the film unit surface. The film unit can then be removed from frame member 10 by folding members 13 and 14 to their open positions and pushing a finger, for example, through opening 20 in frame 10 so as to remove the film unit from recess 12. During the editing process, members 13 and 14 are referenced to the image rows by the use of reference pin members 21 at the corners thereof, which members engage suitably positioned holes or indents 22 along the edge of frame member 10, as shown. That is, each indent is spaced along the frame member 10 a distance equal to the spacing between image rows and the reference pin members 21 are spaced with respect to the row delineating edges 16 and 17 such that when the pins are located in any indent, these edges 16 and 17 lie in adjoining relation to selected image rows.

In the projector apparatus, as described in the aforementioned application, a pair of photodetectors which monitor the white border of the film unit 11 are spaced apart a distance substantially equal to the length of the film unit, and rapid advance of the film unit is provided when either of the pair of detectors senses a dark surface, for example the leading or trailing edges of the film unit. Hence, if the film border is altered, for example by blackening its edge, for a length equal to the distance between image rows, the film unit will be rapidly moved as soon as the condition is sensed and the corresponding row will not be projected. Hence, if the border adjoining the leading edge is blackened for a length equal to several row lengths, for example, through the slot 18, the leading equivalent rows will not be projected. Of course, the same is true for blackening of the border adjoining the trailing edge.

Consequently, the member 13 is constructed such that the distance between the edge 16 and the nearest end of slot 18 is equal to the distance from the first arcuate row to the film leading edge 26. Similarly, the distance from the edge 17 to the near end of slot 19 is equal to the distance from last arcuate row to the trailing edge 28. Hence, for each row that either member covers, its corresponding slot will expose a border length (for blacking) equal to the row spacing plus the distance required by its adjoining edge. Since the film is exposed by starting at one edge and sweeping forward and back, the projector scans in the same manner. Consequently, the film must be edited to blank two rows at a time, otherwise the projector scan would be out of synchronization with the rows, or that is, would progress in the reverse direction along each row. This is controlled in the novel device of the application by means of the indents 22 which are spaced at two-row intervals.

Figure 3:
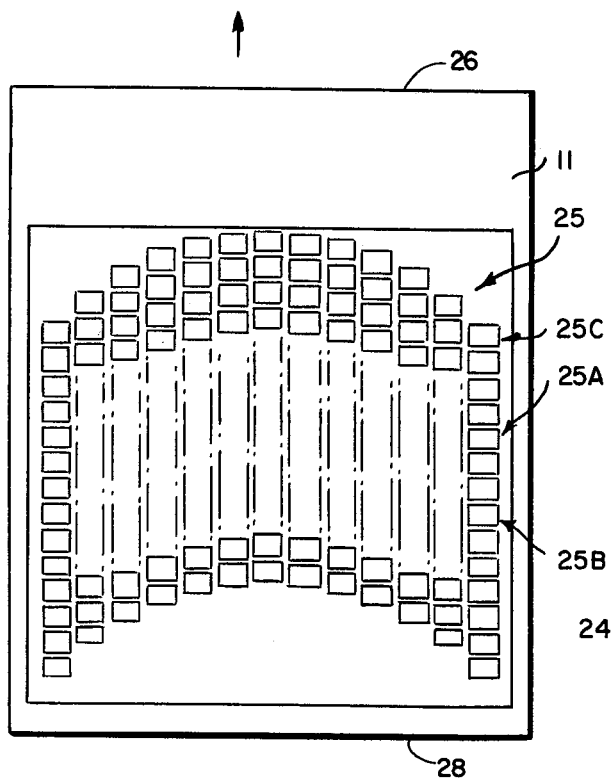
FIGS. 3-5 show plan views of film units in both edited and non-edited states.
Figure 4:
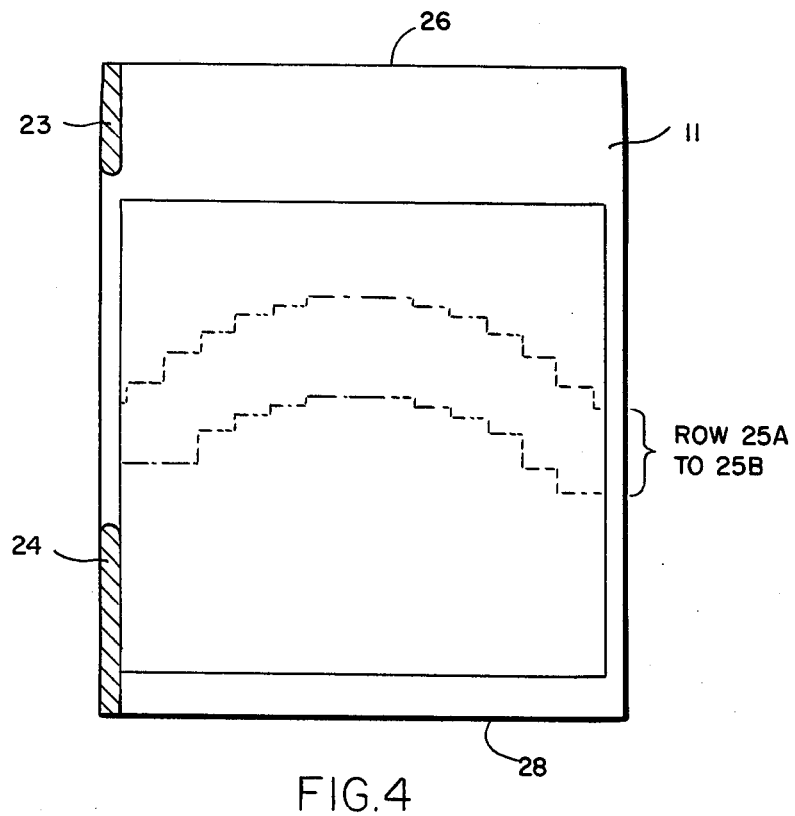

FIG. 3 shows an unedited film unit 11 depicting the arcuate rows of images 25 thereon. If rows from row 25A to row 25B are desired to be projected (four leading and six trailing rows to be edited), the film unit is inserted into the recess 12 of the device 10 of FIGS. 1 and 2, leaving the latter rows exposed between the edges 16 and 17 of members 13 and 14 of the device. Regions 23 (four rows in length) and 24 (six rows in length) are than blackened so that the edited film unit, when removed from device 10, is as shown in FIG. 4.

Figure 5:
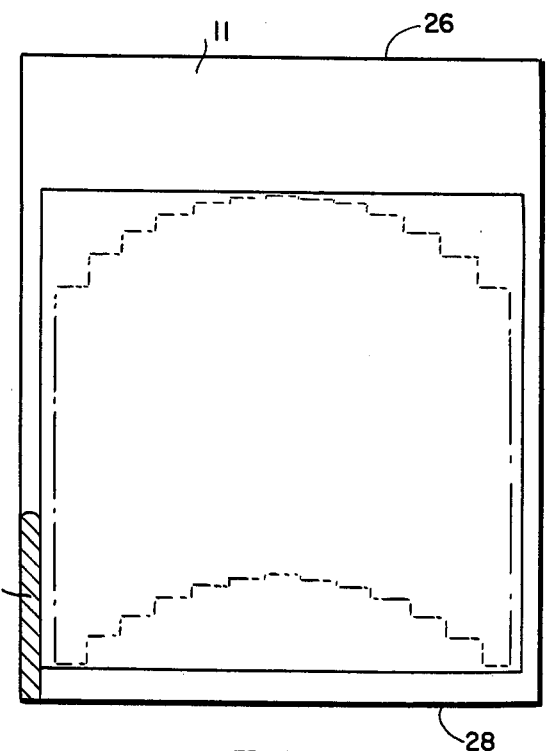

If it is desired that all rows of images from the first row 25C at the forward edge of film unit 11 through row 25B are to be projected (six trailing rows edited), the upper member 13 of device 10 will be slid to its remote position and only the region 24 of the film unit blackened. Such process produces an edited film unit such as shown in FIG. 5.

The edited film units are exemplary only and different regions of a film unit edge can be blackened, depending on which rows of images it is desired should be projected, by suitably positioning the members 13 and 14 of editing device 10 as desired.

Re-editing of a previously edited film unit can be made by inserting the film unit into the device and identifying the images desired for viewing after re-editing, which defines the extent to which the then exposed portions should remain blackened. Subsequently, upon removal of the film unit from the device, the previously blackened regions which no longer require light absorbent characteristics can be appropriately "whitened" by a suitable whitening agent. Alternatively, both borders can be first fully whitened and then again blackened in part by means of the device 10.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A device for editing a film unit having a plurality of images thereon so that a selected number of said images are capable of being viewed when said film unit is used in a viewing system, said images being arranged in a plurality of arcuate rows on said film unit, said editing device comprising:

a frame having means for positioning said film unit;

a template arrangement for identifying a selected number of image rows for subsequent viewing and the remaining image rows for editing, said template arrangement comprising a pair of template members arranged to overlay said film unit so that opposing edges of said members define row delineating edges so as to form an effective frame about said selected image rows and means for exposing selected portions of said film unit corresponding to either said selected or said remaining images to permit altering of the characteristics of said exposed portions so that, when said film unit is used in a viewing system, only said selected image rows will be viewed, said exposing means comprising a slot in each said template in spaced relation to the row delineating edge thereof for providing access to the borders of said film unit for permitting the alteration thereof.

2. The device of claim 1 wherein said slot is spaced from the row delineating edge of its member such that the length of exposed border of said film unit is related to the number of image rows covered by that number.

3. The device of claim 2 wherein said slot is spaced such that the length of exposed border is substantially equal to the distance along the number of rows covered by its said member.

4. A device for editing a film unit having a plurality of images thereon so that a selected number of said images are capable of being viewed when said film unit is used in a viewing system, said images being arranged in a plurality of arcuate rows on said film unit, said editing device comprising a frame having means for positioning said film unit in a fixed location, a template arrangement comprising a pair of movable template members arranged to overlay said film unit so that opposing edges of said movable members form an effective frame about the film images, means for retaining each of said movable members in one of a plurality of fixed locations relative to said frame member when said movable members are arranged in their overlaid positions relative to said film unit so as to position said opposing edges to frame said selected image rows, and means for exposing selected portions of said film unit corresponding to either said selected or remaining image rows to permit altering of the characteristics of said exposed portions so that, when said film unit is used in a viewing system, only selected image rows will be viewed, said exposing means comprising cutaway portions of said templates for providing access to the borders of said film unit for permitting the alteration thereof.

5. The device of claim 4 wherein said fixed locations of said members are spaced a distance equal to the distance spanning the height of two image rows.

6. The device of claim 4 wherein each of said movable members carries a row delineating edge for delineating an image row to be viewed, and a slot is located in each member in spaced relation to the row delineating edge thereof for exposing a border portion of said film unit, said slot being spaced from the row delineating edge of its member such that the length of exposed border of said film unit is related to the number of image rows covered by that member.

7. The device of claim 6 wherein said slot is spaced such that the length of exposed border is substantially equal to the distance along the number of rows covered by its said member.

8. A device for editing a film unit having a plurality of images thereon so that a selected number of said images are capable of being viewed when said film unit is used in a viewing system, said images being arranged in a plurality of arcuate rows on said film unit, said editing device comprising:

a frame having means for positioning said film unit;

a template arrangement for identifying said selected number of images for subsequent viewing and the remaining images for editing, said template arrangement comprising a pair of movable template members being arranged to overlay said film unit so that opposing edges of said movable members form an effective frame about said selected images for thereby selectively presenting said selected images in a distinctive manner relative to the remaining images on said film unit, said template arrangement having means for exposing selected portions of said film unit corresponding to either said selected or said remaining images to permit altering of the characteristics of said exposed portions so that, when said film unit is used in a viewing system, only said selected images are viewed, said exposing means comprising cutaway portions of said templates for providing access to the borders of said film unit for permitting the alteration thereof; and means for retaining said movable members in one of a plurality of fixed locations relative to said image rows when said movable members are arranged in their overlaid positions relative to said film unit, said fixed locations being spaced a distance equal to the distance spanning the height of two image rows, said retaining means including a plurality of selectively placed indents in said frame and pin means on said movable members for engaging selected ones of said openings to locate said movable members in their overlay positions relative to said film unit.

* * * * *